US008139825B2

(12) United States Patent
Abe

(10) Patent No.: US 8,139,825 B2
(45) Date of Patent: Mar. 20, 2012

(54) AUTHENTICATION APPARATUS AND AUTHENTICATION METHOD

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 12/327,592

(22) Filed: Dec. 3, 2008

(65) Prior Publication Data

US 2009/0141944 A1 Jun. 4, 2009

(30) Foreign Application Priority Data

Dec. 4, 2007 (JP) ................................ P2007-313713

(51) Int. Cl.
*G06K 9/00* (2006.01)
*G06F 21/00* (2006.01)
*G06F 7/04* (2006.01)
(52) U.S. Cl. ............. 382/115; 382/124; 713/186; 726/2
(58) Field of Classification Search .................. 382/100, 382/115, 116, 117, 118, 124, 126; 340/5.8, 340/5.83, 5.81, 5.82; 702/1, 19; 713/150, 713/155, 168, 170, 176, 182, 185, 186; 726/26, 726/27, 28, 2
See application file for complete search history.

(56) References Cited

U.S. PATENT DOCUMENTS

| 7,599,522 B2 * | 10/2009 | Ito .................................. 382/115 |
| 7,729,518 B2 * | 6/2010 | Awatsu et al. ................. 382/115 |
| 2006/0098844 A1 * | 5/2006 | Luo ................................. 382/103 |
| 2007/0057764 A1 * | 3/2007 | Sato et al. .................... 340/5.52 |
| 2007/0177767 A1 * | 8/2007 | Miura et al. .................. 382/115 |
| 2009/0174662 A1 * | 7/2009 | Kato ............................. 345/163 |
| 2009/0285453 A1 * | 11/2009 | Muquit et al. ................ 382/115 |

FOREIGN PATENT DOCUMENTS

| EP | 1 198 124 A1 | 4/2002 |
| EP | 1 522 953 A1 | 4/2005 |
| EP | 1 541 086 A1 | 6/2005 |
| JP | 2007-11989 | 1/2007 |

OTHER PUBLICATIONS

European Search Report from European Patent Office dated Mar. 10, 2009, for Application No. 08253595.6-2218, 6 pages.

* cited by examiner

*Primary Examiner* — Sheela Chawan
(74) *Attorney, Agent, or Firm* — Finnegan, Henderson, Farabow, Garrett & Dunner, L.L.P.

(57) ABSTRACT

An authentication apparatus includes: a first determination section that determines whether a condition for determining that there is a possibility of an erroneous determination is satisfied based on information indicating the similarity between the shape of a biological part included in a biological image to be authenticated and the shape of a biological part included in a registration biological image; a change section that changes an aspect ratio of the biological image to be authenticated and registration biological image in the case where the above condition is satisfied; and a second determination section that determines whether a person to be authenticated is a registrant based on the similarity between the shape of a biological part included in a biological image to be authenticated whose aspect ratio has been changed and the shape of a biological part included in a registration biological image whose aspect ratio has been changed.

9 Claims, 15 Drawing Sheets

FIG.10A-1
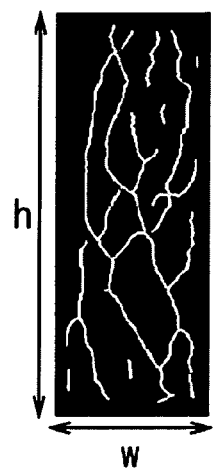
FIG.10B-1
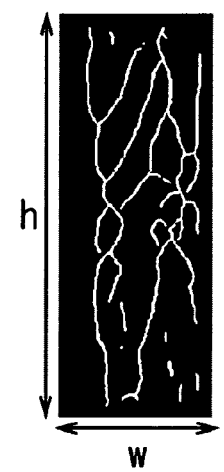
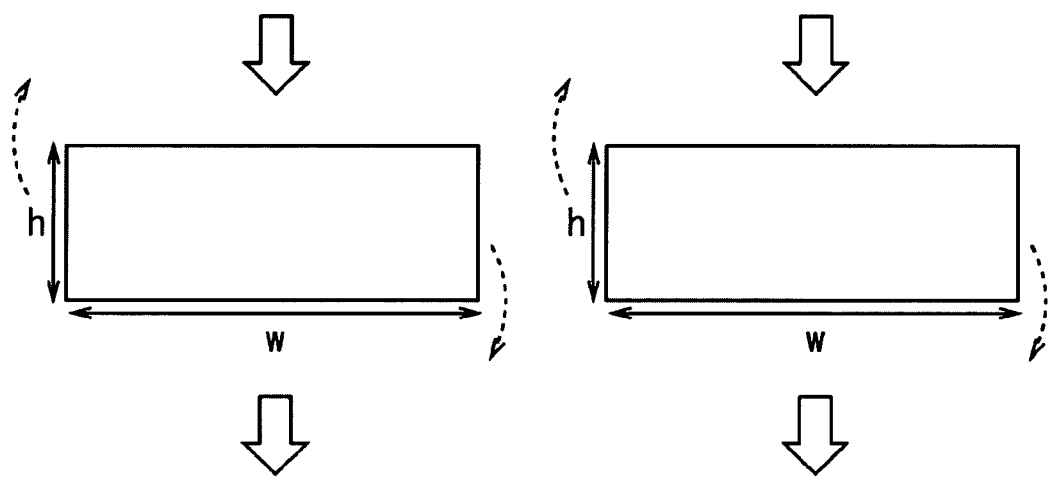
FIG.10A-2
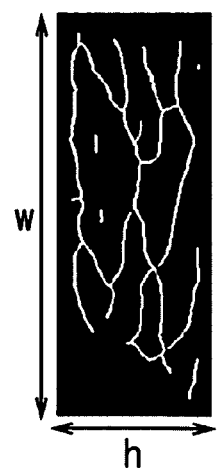
FIG.10B-2
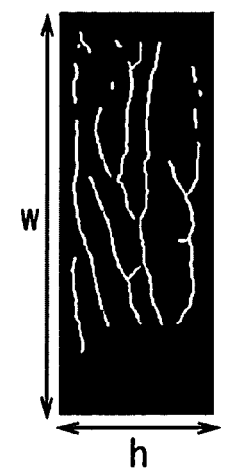

AFTER CHANGE OF ASPECT RATIO

AUTHENTICATION APPARATUS AND AUTHENTICATION METHOD

CROSS REFERENCES TO RELATED APPLICATIONS

The present invention contains subject matter related to Japanese Patent Application JP2007-313713 filed in the Japanese Patent Office on Dec. 4, 2007, the entire contents of which being incorporated herein by reference.

BACKGROUND OF THE INVENTION

1. Field of the Invention

The present invention relates to an authentication apparatus and an authentication method which are suitably applied to, e.g., biometrics.

2. Description of the Related Art

There is known a vein authentication apparatus that uses vein of a finger as a target of biometrics. The vein authentication apparatus generates vein pattern information from a vein image obtained as an image pickup result of veins in a finger and collates the pattern information with pattern information previously stored in a storage section.

When a value representing the collation result is not less than a limiting value (hereinafter, referred to also as "threshold") for identifying a person to be authenticated as a registrant, the vein authentication apparatus determines the person to be authenticated as the registrant (determines authentication success), while when a value representing the collation result is less than a threshold, the vein authentication apparatus determines the person to be authenticated as an unregistered person (determines authentication failure).

As a generation method of the pattern information, there is proposed a technique that applies smoothing processing and edge extraction processing to the vein image and converts the veins in the resultant image into a pattern of lines having a constant width (refer to, e.g., Jpn. Pat. Appln. Laid-Open Publication No. 2007-11989).

In this generation method, it is possible to correctly convert the shape of the veins into a pattern image by highlighting the veins in the image through preprocessing for the smoothing processing and edge extraction processing, thereby decreasing a false rejection rate (FRR) and a false acceptance rate (FAR). The FRR is the probability that a registrant is erroneously rejected, and the FAR is a probability that an invalid person is erroneously accepted.

SUMMARY OF THE INVENTION

However, the preprocessing aims to increase the extraction accuracy of the shape of the veins, so that even if the shape of the veins is correctly converted into a pattern image, there remains a possibility of erroneous determination for two vein patterns when the original shapes thereof are similar to each other.

In general, when a limiting value (hereinafter, referred to also as "threshold") for identifying a person to be authenticated as a registrant is set low with respect to a collation result (matching degree) of the pattern information of the veins, the FRR decreases while the FAR increases, making it difficult to balance between the FRR and FAR.

The present invention has been made in view of the above points, and to propose an authentication apparatus and an authentication method capable of improving authentication accuracy.

To solve the above problem, according to a first aspect of the present invention, there is provided an authentication apparatus including: a first determination section that determines whether a condition for determining that there is a possibility of an erroneous determination is satisfied based on information indicating the similarity between the shape of a biological part included in a biological image to be authenticated and the shape of a biological part included in a registration biological image; a change section that changes an aspect ratio of the biological image to be authenticated and registration biological image in the case where the above condition is satisfied; and a second determination section that determines whether a person to be authenticated is a registrant based on the similarity between the shape of a biological part included in a biological image to be authenticated whose aspect ratio has been changed and the shape of a biological part included in a registration biological image whose aspect ratio has been changed.

In the authentication apparatus, the change section changes the aspect ratio of the biological image to be authenticated and registration biological image to thereby emphasize a difference in a biological part included in the respective images. This allows the second determination section to correctly determine whether a person to be authenticated is a registrant even if the shapes themselves of the biological parts included in the biological image to be authenticated and registration biological image are approximated to each other.

Further, according to a second aspect of the present invention, there is provided an authentication method including: a first step of determining whether a condition for determining that there is a possibility of an erroneous determination is satisfied based on information indicating the similarity between the shape of a biological part included in a biological image to be authenticated and the shape of a biological part included in a registration biological image; a second step of changing an aspect ratio of the biological image to be authenticated and registration biological image in the case where the above condition is satisfied; and a third step of determining whether a person to be authenticated is a registrant based on the similarity between the shape of a biological part included in a biological image to be authenticated whose aspect ratio has been changed and the shape of a biological part included in a registration biological image whose aspect ratio has been changed.

In the authentication method, the second step changes the aspect ratio of the biological image to be authenticated and registration biological image to thereby emphasize a difference in a biological part included in the respective images. This allows a correct determination on whether a person to be authenticated is a registrant to be made in the third step even if the shapes themselves of the biological parts included in the biological image to be authenticated and registration biological image are approximated to each other.

Further, according to a third aspect of the present invention, there is provided an authentication apparatus including: an acquisition section that acquires a magnification ratio of a subject set in an image pickup section that has generated a biological image to be authenticated through image pickup operation and magnification ratio of a subject set in an image pickup section that has generated a registration biological image through image pickup operation; a change section that changes an aspect ratio of the biological image to be authenticated or registration biological image so as to make the magnification ratios acquired by the acquisition section equal to each other; a determination section that determines whether a person to be authenticated is a registrant based on the similarity between the shape of a biological part included in a biological image to be authenticated whose aspect ratio has been changed and the shape of a biological part included in a registration biological image whose aspect ratio has been changed.

In the authentication apparatus, the change section changes the aspect ratio of the biological image to be authenticated or registration biological image so as to make equal the magnification ratio of subjects in image pickup sections that have generated the respective images through image pickup operation, thereby eliminating displacement of the biological part caused due to difference in the magnification ratio. This allows the determination section to correctly determine whether a person to be authenticated is a registrant even if the shapes themselves of the biological parts included in the biological image to be authenticated and registration biological image are approximated to each other.

Further, according to a fourth aspect of the present invention, there is provided an authentication method including: a first step of acquiring the magnification ratio of a subject set in an image pickup section that has generated a biological image to be authenticated through image pickup operation and magnification ratio of a subject set in an image pickup section that has generated a registration biological image through image pickup operation; a second step of changing the aspect ratio of the biological image to be authenticated or registration biological image so as to make the magnification ratios acquired by the acquisition section equal to each other; a third step of determining whether a person to be authenticated is a registrant based on the similarity between the shape of a biological part included in a biological image to be authenticated whose aspect ratio has been changed and the shape of a biological part included in a registration biological image whose aspect ratio has been changed.

In the authentication apparatus, the second step changes the aspect ratio of the biological image to be authenticated or registration biological image so as to make equal the magnification ratio of subjects in image pickup sections that have generated the respective images through image pickup operation, thereby eliminating displacement of the biological part caused due to difference in the magnification ratio. This allows a correct determination on whether a person to be authenticated is a registrant to be made in the third step even if the shapes themselves of the biological parts included in the biological image to be authenticated and registration biological image are approximated to each other.

As described above, according to the present invention, the aspect ratio of the biological image is changed so as to eliminate the displacement in the biological part caused due to difference in the magnification ratio. This makes it possible to correctly determine whether a person to be authenticated is a registrant even if the shapes themselves of the veins are approximated to each other. As a result, the authentication apparatus and authentication method capable of improving authentication accuracy can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 10A and 10B are schematic views showing change examples of aspect ratio (vertical-to-horizontal ratio);

DETAILED DESCRIPTION OF THE PREFERRED EMBODIMENTS

Embodiments of the present invention will be described in detail below with reference to the accompanying drawings.

(1) First Embodiment (1-1) Entire Configuration of Authentication Apparatus

Figure 1:
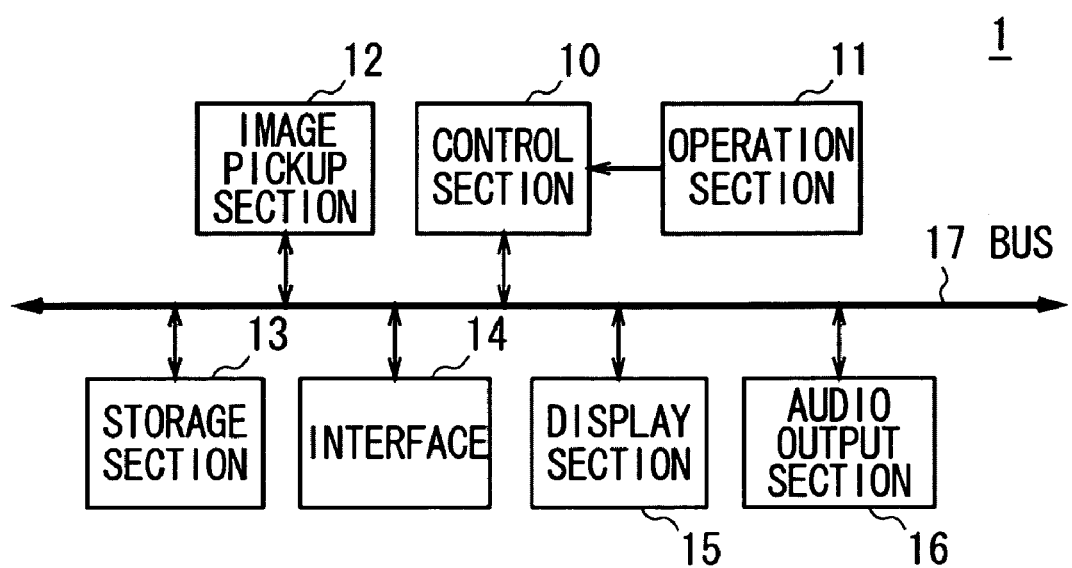
FIG. 1 is a block diagram showing the entire configuration of an authentication apparatus according to a first embodiment of the present invention.

FIG. 1 shows the entire configuration of an authentication apparatus according to a first embodiment of the present invention. An authentication apparatus 11 of FIG. 1 includes a control section 10, an operation section 11, an image pickup section 12, a storage section 13, an interface 14, a display section 15, and an audio output section 16. The operation section 11, image pickup section 12, storage section 13, interface 14, display section 15, and audio output section 16 are connected to the control section 10 through a bus 17.

The control section 10 is constructed as a computer including a central processing unit (CPU) that controls the entire operation of the authentication apparatus 1, a read only memory (ROM) that stores various programs, various setting information, and the like, and a random access memory (RAM) that serves as a work memory for the CPU.

The control section 10 receives as an input through the operation section 11 an execution command COM 1 for executing a mode (hereinafter, referred to also as "vein registration mode") of registering veins of a user (hereinafter, referred to also as "registrant") to be registered or an execution command COM2 for executing a mode (hereinafter, referred to as "authentication mode") of determining presence/absence of the registrant.

The control section 10 determines a mode to be executed based on the execution commands COM1 and COM2 and appropriately controls the image pickup section 12, storage section 13, interface 14, display section 15, and audio output section 16 based on a program corresponding to the determination so as to execute the vein registration mode or authentication mode.

The image pickup section 12 irradiates a light input surface on which a finger is placed with a light (hereinafter, referred to also as "near-infrared light") having a wavelength of a range (700 nm to 900 nm) that has characteristics of specifically being absorbed both by deoxygenated hemoglobin and oxygenated hemoglobin.

Further, the image pickup section 12 generates image data (hereinafter, referred to also as "vein image") corresponding an image of veins in a biological object placed on the light input surface every predetermined cycle and transmits the generated image data to the control section 10.

The storage section 13 is provided for holding an image (hereinafter, referred to as "registration image") to be registered generated from the vein image, programs, or various data such as setting information and stores or reads out data specified by the control section 10.

The interface 14 exchanges various data with an external device connected thereto through a predetermined transmission path.

The display section 15 displays a text or graphic corresponding to display data supplied from the control section 10. The audio output section 16 outputs audio corresponding to audio data supplied from the control section 10 through a speaker.

(1-1-1) Vein Registration Mode

Figure 2:
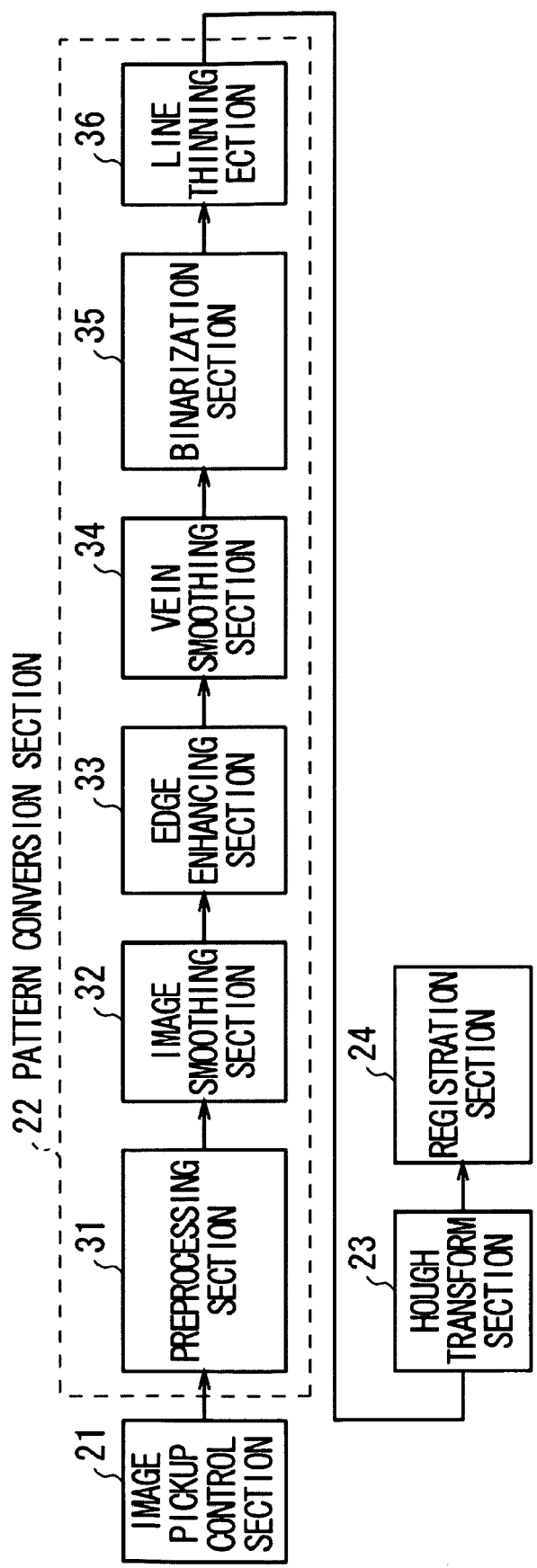
FIG. 2 is a block diagram showing a functional configuration of a control section in a vein registration mode.

The vein registration made will next be described. When determining to execute the vein registration mode, the control section 10 prompts a user to place his or her finger on the light input surface through the display section 15 or audio output section 16 and then functions as an image pickup control section 21, a pattern conversion section 22, a Hough transform section 23, and a registration section 24 as shown in FIG. 2.

The image pickup control section 21 drives a near-infrared light source so as to irradiate the back side of a vein layer in the finger placed on the light input surface with a near-infrared light. When the near-infrared light is irradiated onto the back side of the vein layer in the finger, the near-infrared light is reflected and dispersed in the finger to be passed through the vein layer and epidermal layer and enters the light input surface. The near-infrared light entering the light input surface makes a non-vein portion in the finger bright while a dark state is kept in a vein portion due to light absorption characteristics of the hemoglobin, making the contrast between the vein portion and non-vein portion clear. As a result, the near-infrared light is guided to the image pickup surface of the image-pickup section 12 as a light (hereinafter, referred to also as "vein projecting light") projecting the veins.

Further, the image pickup control section 21 adjusts the position of an optical lens such that the focal point of the optical lens coincides with the veins based on image data output from the image pickup section 12 and adjusts the aperture and shutter speed (exposure time) using a predetermined exposure value (EV) as a reference, to thereby set an image pickup condition of the image pickup section 12 so that the image pickup condition for image-picking up the veins in the finger placed on the light input surface becomes satisfactory.

After setting the image pickup condition of the image pickup section 12, the image pickup control section 21 transmits image data output from the image pickup section 12 to the pattern conversion section 22.

The pattern conversion section 22 includes a preprocessing section 31, an image smoothing section 32, an edge enhancing section 33, a vein smoothing section 34, a binarization section 35, and a line thinning section 36.

The preprocessing section 31 applies, if needed, predetermined preprocessing to a vein image corresponding to the image data supplied, as a result of image pickup operation in the image pickup section 12, from the image pickup control section 21. The predetermined preprocessing includes processing of cutting out an area having a predetermined size from the vein image, processing of making the long axis of the finger included in the vein image parallel to the vertical or horizontal direction of the image, and the like.

The image smoothing section 32 uses, e.g., a space filter called "Gaussian" to apply filtering processing to the vein image generated as a result of the processing in the preprocessing section 31 to thereby smooth the vein image.

The edge enhancing section 33 uses, e.g., a space filter called "Laplacian of Gaussian (Log)" to apply filtering processing to the vein image generated as a result of the processing in the image smoothing section 32 to thereby enhance (highlight) the edge of the veins included in the vein image.

The vein smoothing section 34 uses, e.g., a space filter called "Median" to apply filtering processing to the vein image generated as a result of the processing in the edge enhancing section 33 to thereby smooth the veins included in the vein image.

Figure 3A:
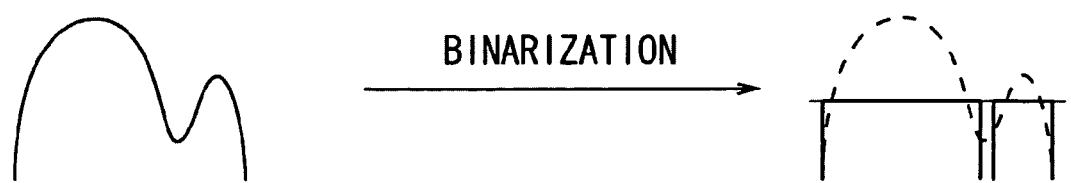
FIGS. 3A and 3B are schematic views showing a state transition of illuminance in pattern conversion processing.
Figure 3B:
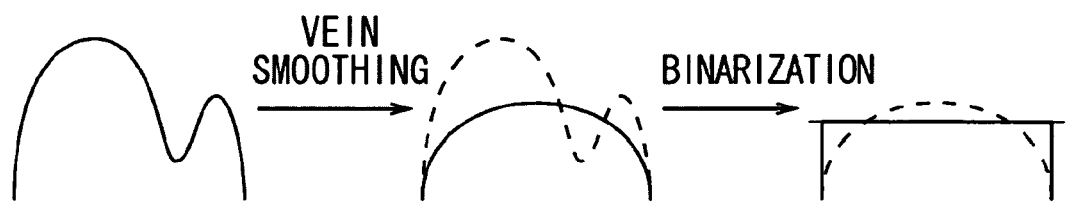

The binarization section 35 converts the vein image generated as a result of the processing in the vein smoothing section 34 into a binary image using a set illuminance as a reference. Assuming that a vein image in which the veins therein have not been subjected to the smoothing is set as an image to be binarized, a probability that one vein actually existing in the vein image is divided into two veins due to the binarization (FIG. 3A). Therefore, the vein image in which the veins therein have been subjected to the smoothing is set as an image to be binarized. This makes it possible to bring the vein image close to the actual veins (FIG. 3B).

The line thinning section 36 uses, e.g., a space filter called "Morphology" to apply filtering processing to the binary vein image generated as a result of the processing in the binarization section 35 to thereby make the widths of the vein included in the vein image constant with the center of each vein in the width direction or illuminance peak set as a reference.

As described above, the pattern conversion section 22 generates a binary vein image (hereinafter, referred to also as "pattern image") composed of a vein component having a constant width and a background component.

The Hough transform section 23 applies Hough transform to the pattern image. Here, the Hough transform will be briefly described.

Figure 4:
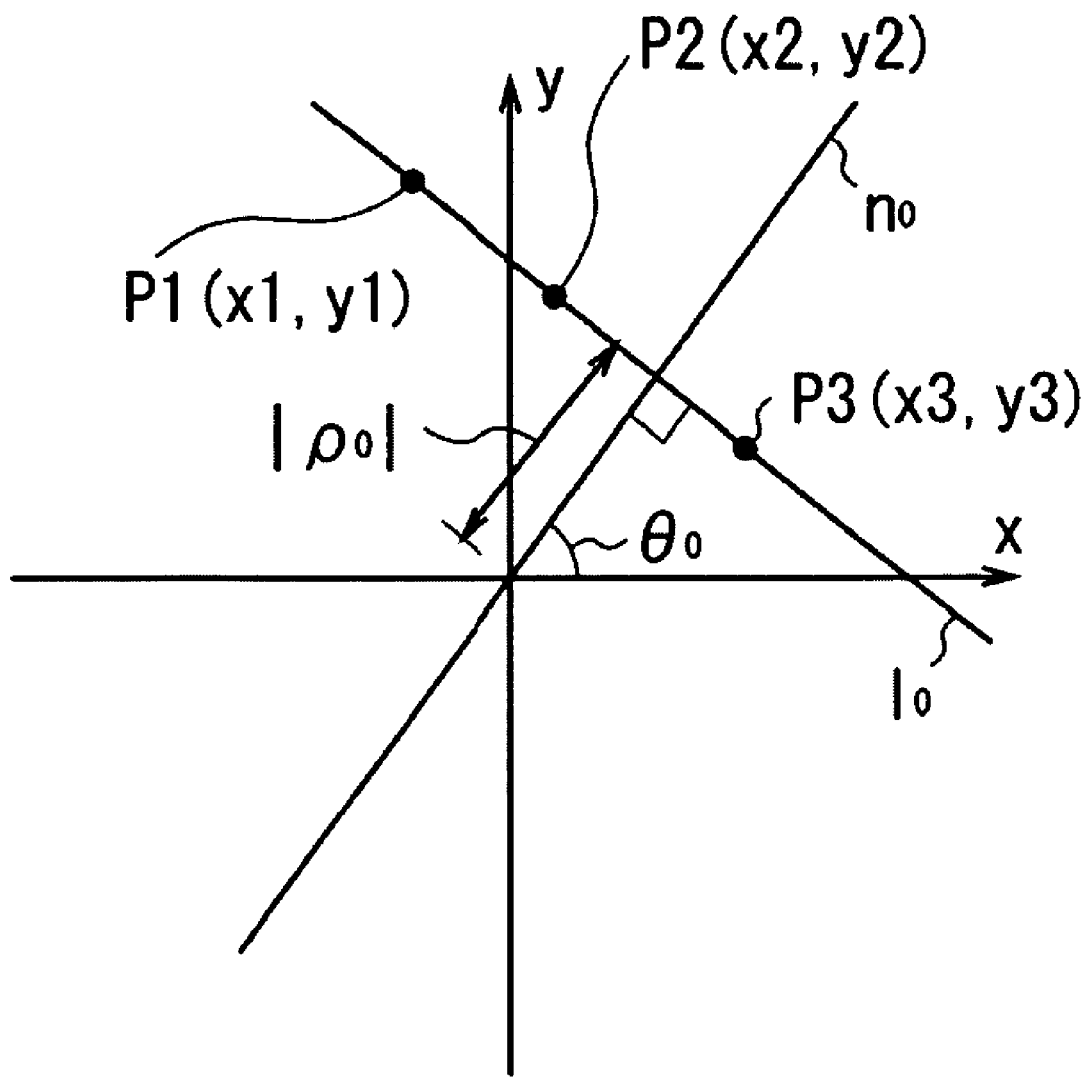
FIG. 4 is a schematic view concerning expression of lines on x-y plain.

As shown in FIG. 4, straight line lo can be represented as "($\rho o$, $\theta o$)", where normal line normal to the straight line lo and passing through the origin (reference position) is no, angle formed by x-axis (reference direction) and the normal line no is $\theta o$, and distance from the origin to the intersection between the straight line lo and normal line no is "$|\rho o|$".

Figure 5:
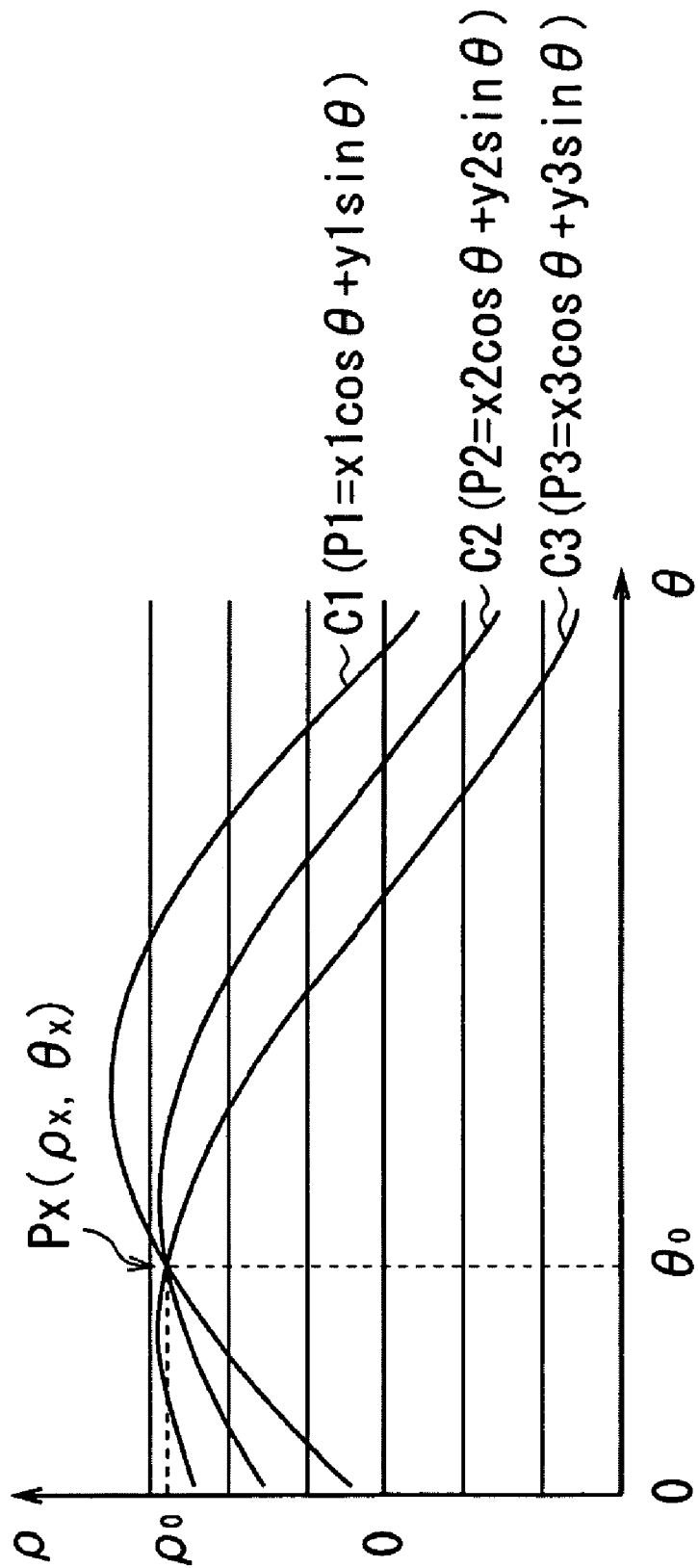
FIG. 5 is a schematic view concerning a point on ρ-θ plane.

The Hough transform is defined as "$\rho = x \cos \theta + y \sin \theta$". Point P1 ($x_1$, $y_1$), point P2 ($x_2$, $y_2$), and point P3 ($x_3$, $y_3$) on the straight line lo shown in FIG. 4 are represented as curved line C1 ($x_1 \cos \theta + y_1 \sin \theta$), C2 ($x_2 \cos \theta + y_2 \sin \theta$), and C3 ($x_3 \cos \theta + y_3 \sin \theta$) in a Hough space ($\rho$-$\theta$ space) as shown in FIG. 5.

The curved lines C1, C2, and C3 have intersection P ($\rho_x$, $\theta_x$) which corresponds to the straight line lo in the x-y plane before Hough transform. The more the number of points (P1, P2, P3, ..., Pn, ...) that can be plotted on the straight line lo in the x-y plane is, the more the number of curved lines (C1, C2, C3, ..., Cn, ...) appear in the $\rho$-$\theta$ space, with the result that the number of the curves passing through the intersection Px ($\rho_x, \theta_x$) is increased. That is, when the straight line lo in the x-y plane is longer, the number of curved lines (C1, C2, C3, ..., Cn, ...) overlapping each other at the intersection Px ($\rho_x, \theta_x$) is increased.

As described above, the intersection P ($\rho_x, \theta_x$) is a parameter depending on the length of the straight line in the x-y plane. Thus, the degree of overlapping of the curved lines (the number of curved lines overlapping each other) at the intersection P ($\rho_x, \theta_x$) is increased or decreased depending on the line length.

Figure 6A:
FIGS. 6A and 6B are schematic views showing images before and after Hough transform.
Figure 6B:
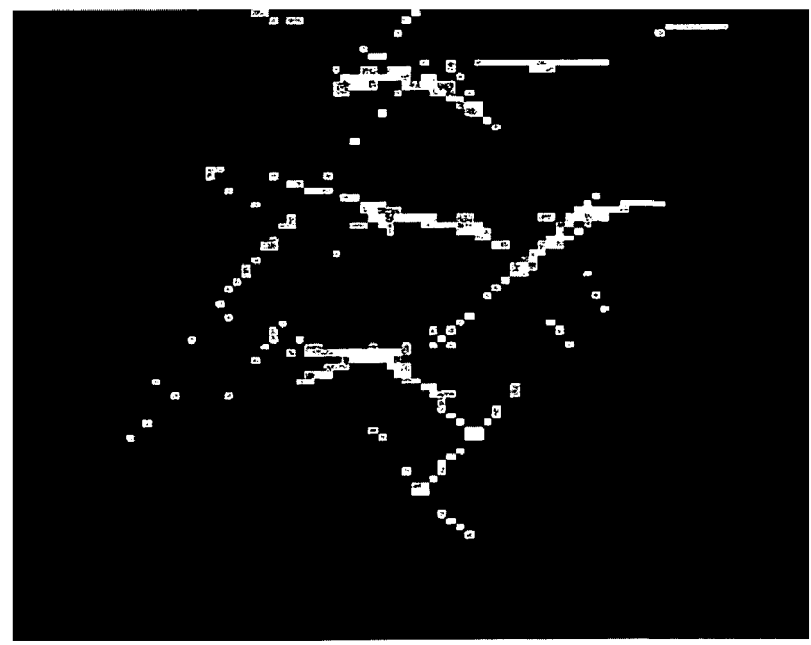

Accordingly, in the Hough transform, how much a line component having a length not less than a predetermined length exists in the x-y plane can be represented (quantified). FIGS. 6A and 6B show examples of images before and after the Hough transform. As is clear from the example of FIG. 6B, in the image after the Hough transform, the longer the line component is, the higher the density of white region becomes.

Incidentally, the length of the straight line lo in the x-y plane section not simply the length of the line, but is regarded as one line in the case where the line is a broken (dotted) line or where the line is partly faded.

As described above, the Hough transform section 23 generates an image (hereinafter referred to also as "Hough image") representing a state of a line component having a length not less than a predetermined length from the pattern image.

The registration section 24 acquires the pattern image generated by the pattern conversion section 22 and Hough image generated by the Hough transform section 23 and registers the pattern image and Hough image in the storage section 13 as registration images in association with each other.

In this way, the control section 10 executes the vein registration mode.

(1-1-2) Authentication Mode

Figure 7:
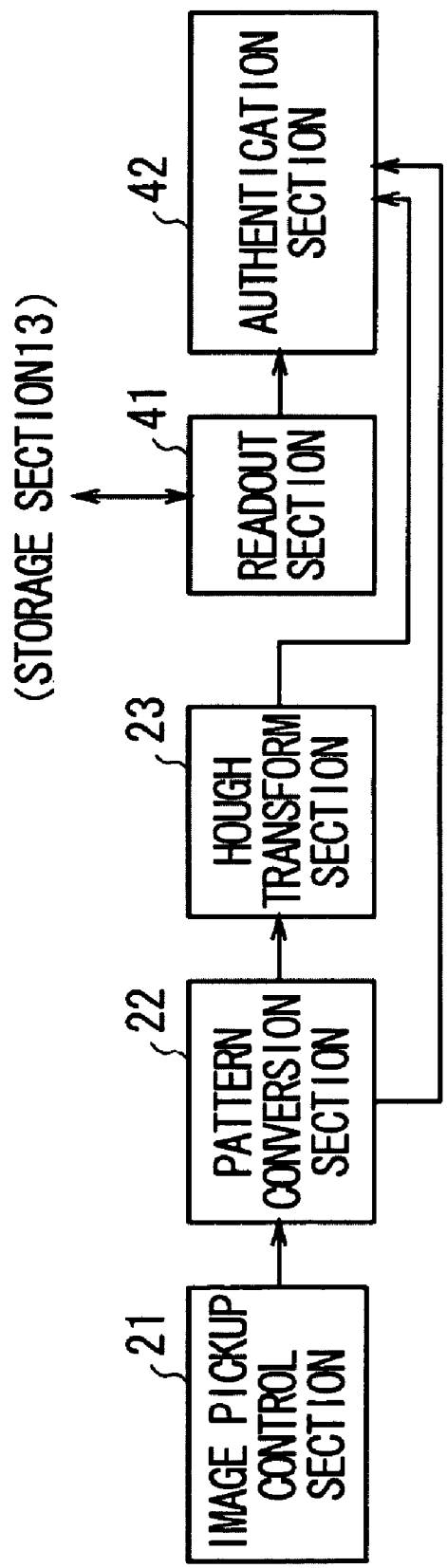
FIG. 7 is a block diagram showing a functional configuration of the control section in an authentication mode.

The authentication mode will next be described. When determining to execute the authentication mode, the control section 10 prompts a user to place his or her finger on the light input surface through the display section 15 or audio output section 16 and then functions as the image pickup control section 21, pattern conversion section 22, Hough transform section 23, a readout section 41 and an authentication section 42 as shown in FIG. 7 in which corresponding parts are designated by the same reference numerals as in FIG. 2.

The image pickup control section 21 drives a light source so as to irradiate the back side of a vein layer in the finger placed on the light input surface and sets the image pickup condition of the image pickup section 12. The pattern conversion section 22 applies the same conversion processing as in the vein registration mode to image data supplied from the image pickup section 12 through the image pickup control section 21 to thereby generate a pattern image to be authenticated. The Hough transform section 23 applies the same transformation processing as in the vein registration mode to the pattern image to be authenticated to thereby generate a Hough image to be authenticated.

The readout section 41 reads out the pattern image and Hough image stored in the storage section 13 as the registration images and transmits the registration images to the authentication section 42.

The authentication section 42 calculates the similarity between veins based on the registration pattern and Hough images and pattern and Hough images to be authenticated and determines whether a person to be authenticated is a registrant or not (whether authentication has succeed or failed) based on the similarity.

When determining that a person to be authenticated is not a registrant (authentication has failed), the authentication section 42 executes processing specified to be executed at the time of authentication failure. On the other hand, when determining that a person to be authenticated is a registrant (authentication has succeeded), the authentication section 42 executes processing specified to be executed at the time of authentication success.

In this way, the control section 10 executes the authentication mode.

(1-2) Configuration of Authentication Section

Figure 8:
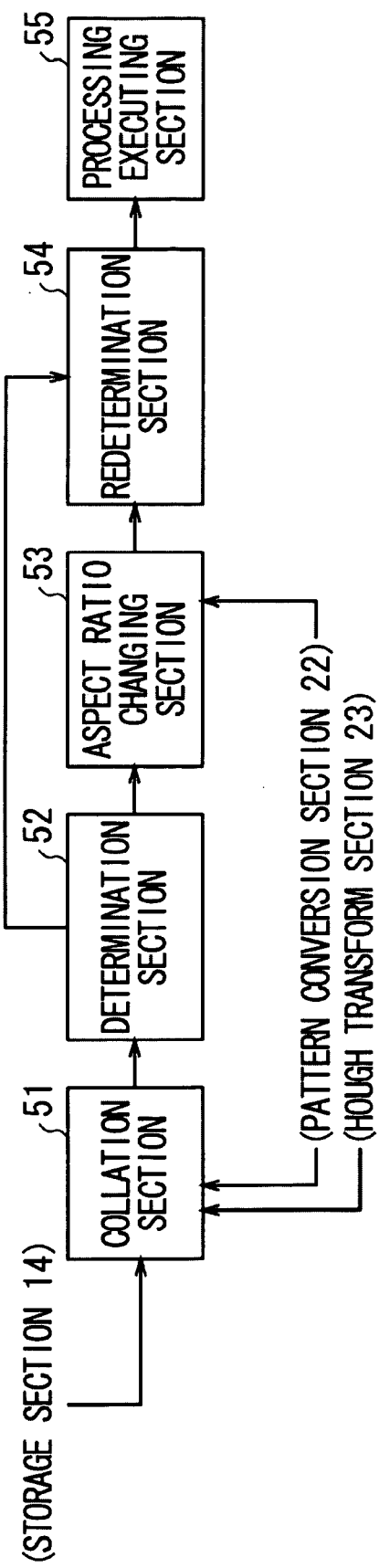
FIG. 8 is a block diagram showing a configuration of an authentication section.
Figure 9:
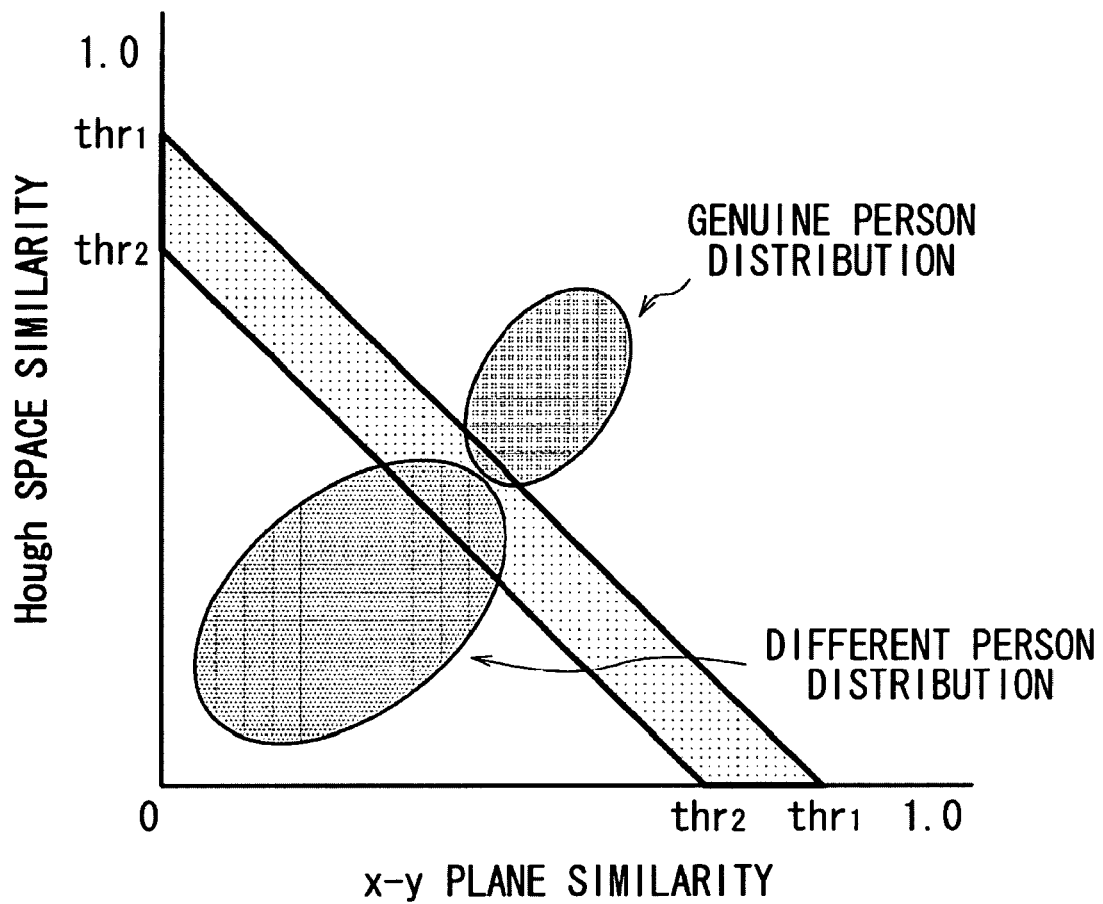
FIG. 9 is a schematic view showing the relationship among a threshold, genuine person distribution, and different person distribution.

A configuration of the authentication section 42 will be described. The authentication section 42 according to the present embodiment includes a collation section 51, a determination section 52, an aspect ratio changing section 53, a redetermination section 54, and a processing executing section 55 as shown in FIG. 8.

The collation section 51 acquires the registration pattern image readout from the storage section 13 and pattern image to be authenticated generated by the pattern conversion section 22, and also acquires the registration Hough image read out from the storage section 13 and Hough image to be authenticated generated by the Hough transform section 23.

Then the collation section 51 collates the registration pattern image with the pattern image to be authenticated, and also collates the registration Hough image and the Hough image to be authenticated. For example, a collation method that calculates the similarity (or degree of difference) between the respective images to be collated, such as cross-correlation function, phase correlation function, or sum of absolute difference (SAD) is used in the collation processing.

The determination section 52 adds up the similarity (cross-correlation function, etc.) between the pattern images and similarity (cross-correlation function, etc.) between the Hough images which are calculated by the collation section 51 and compares the added value with a first threshold set with respect to the added value.

When the added value is not less than the first threshold, which means that vein patterns appearing in the pattern images coincide or substantially coincide with each other and patterns of the Hough images, which are generated from the pattern images and represent a state of a line component having a length not less than a predetermined length, coincide or substantially coincide with each other, so the determination section 52 determines that the person to be authenticated is a registrant (authentication success).

On the other hand, when the added value is less than the first threshold, the determination section 52 compares the added value with a second threshold set lower than the first threshold. When the added value is less than the second threshold, which means that one or both of vein patterns appearing in the pattern images and patterns of the Hough images, which are generated from the pattern images and represent a state of a line component having a length not less than a predetermined length, largely differ from each other, so the determination section 52 determines that the person to be authenticated is not a registrant (authentication failure).

On the other hand, when the added value is less than the first threshold and not less than the second threshold, which means that a difference between vein patterns appearing in the pattern images and a difference between patterns of the Hough images, which are generated from the pattern images and represent a state of a line component having a length not less than a predetermined length, statistically exist in a mixed area (area surrounded by a bold line in the figure) of genuine person distribution and different person distribution, so the determination section 52 determines that there is a possibility of an erroneous determination that the person to be authenticated is not a registrant.

When the determination section 52 determines that there is a possibility of an erroneous determination (when the added value is less than the first threshold and not less than the second threshold), the aspect ratio changing section 53 acquires the registration pattern image and pattern image to be authenticated which are set as collation targets in the collation section 51 and changes the aspect ratio (vertical-to-horizontal ratio) of the acquired pattern images.

Concretely, for example, an image of a size of "a×b" is changed into an image of a size of "b×a". FIGS. 10A and 10B show examples of images before and after the change of aspect ratio. In the examples of FIGS. 10A and 10B, the aspect ratio of the respective images before change (FIGS. 10A-1 and 10B-1) is changed such that the vertical and horizontal dimensions thereof are reversed (denoted by dotted lines), and the images after the change are rotated by 90° (FIGS. 10A-2 and 10B-2).

The vein is more likely to be formed in the growth direction of the finger, a difference between a vein (hereinafter, referred to also as "growth direction vein") extending in parallel to the growth direction and a vein (hereinafter, referred to as "oblique direction vein") extending obliquely with respect to the growth direction (inclined by an angle larger than 0° with respect to the growth direction) is larger after the change of aspect ratio than before.

Figure 11A:
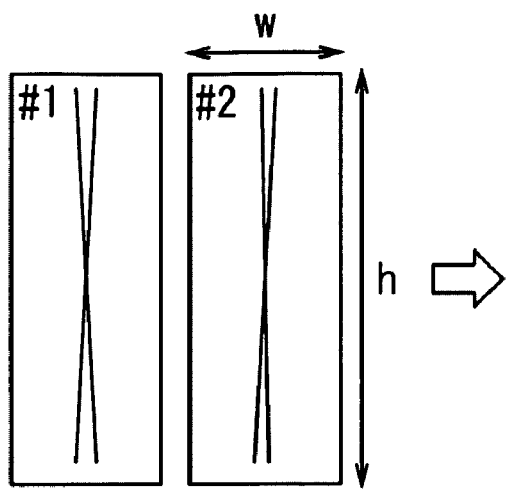
FIG. 11 is a schematic view showing a change in the shape of the veins occurring due to a change of aspect ratio.
Figure 11B:
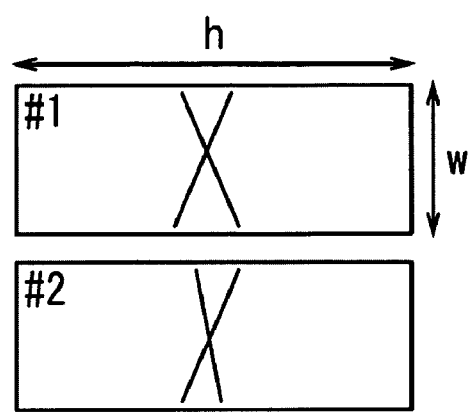

That is, as shown in FIG. 11, even if the shapes of given two vein patterns are similar to each other (FIG. 11A), when the aspect ratio is changed (FIG. 11B), the relationship between the growth direction vein and oblique direction vein is emphasized to make a difference between the vein patterns clear.

The redetermination section 54 (FIG. 8) collates the registration pattern image after change of aspect ratio with the pattern image to be authenticated after change of aspect ratio and compares the collation result with a third threshold set with respect to the collation result. The collation method employed in the redetermination section 54 may be the same as or different from the collation method employed in the collation section 51.

When the collation result is not less than the third threshold, which means that the shapes of the vein patterns are substantially the same even after the change of aspect ratio and a confirmation that determination section 52 had erroneously determined that the person to be authenticated is not a registrant although the veins in both the registration pattern image and pattern image to be authenticated actually belong to a registrant him or herself has been obtained, so the redetermination section 54 determines that the person to be authenticated is a registrant (authentication success).

On the other hand, when the collation result is less than the third threshold, which means that a large difference becomes apparent in the shapes of the vein patterns of two pattern images, and a confirmation that the determination section 52 had properly determined that the person to be authenticated is not a registrant has been obtained, so the redetermination section 54 determines that the person to be authenticated is not a registrant (authentication failure).

Figure 12:
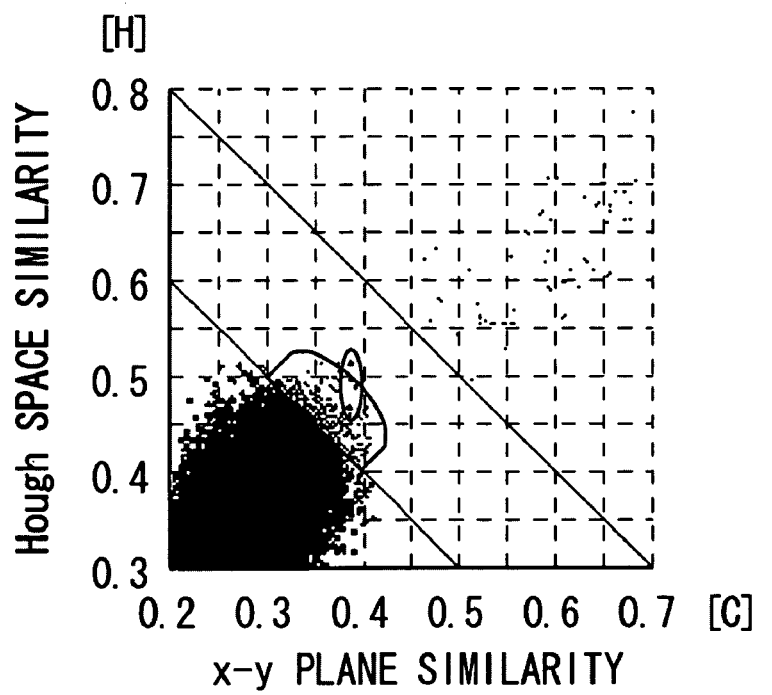
FIG. 12 is a schematic view showing changes in the genuine person distribution and different person distribution after a change of aspect ratio.
Figure 12:
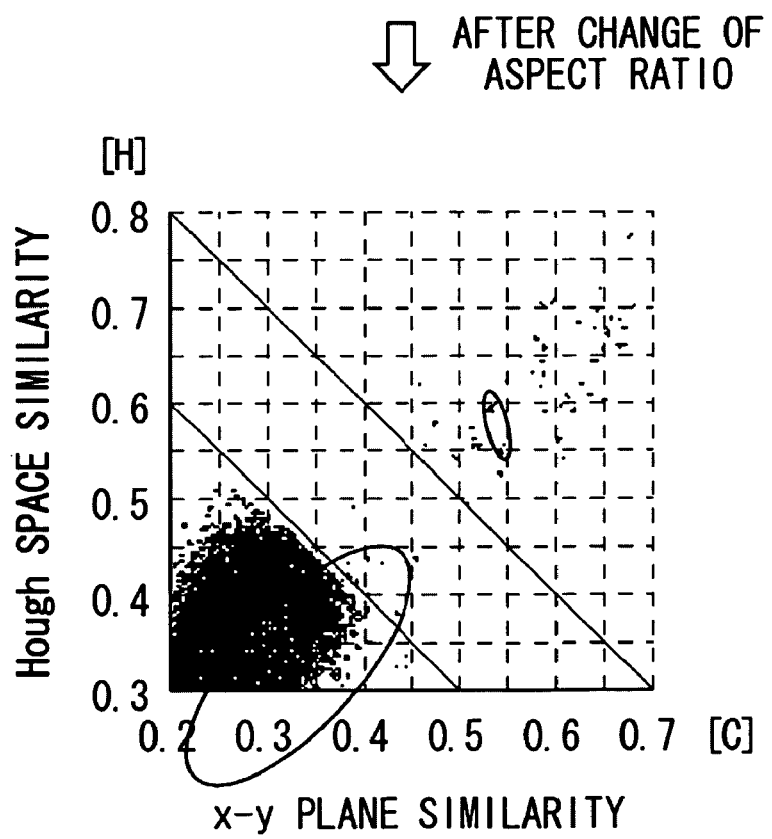

FIG. 12 shows changes in the genuine person distribution and the different person distribution within the mixed area occurring with the change of aspect ratio. This is obtained as a result of authentication processing made based on 192-pattern vein images obtained by performing image pickup operation three times respectively for 64 different fingers.

In FIG. 12, the cross-correlation coefficient ($0 \leq C \leq 1$) is adopted as the similarity of the pattern image (x-y plane), and cross-correlation coefficient ($0 \leq H \leq 1$) is adopted as the similarity of the Hough image ($\rho$-$\theta$) space. Threshold thr1 is the first threshold set for the sum of the cross-correlation coefficients, and threshold thr2 is the second threshold lower than the threshold thr1.

As is clear from FIG. 12, of the genuine person distribution and different person distribution existing in a mixed state between the first and second thresholds thr1 and thr2, the different person distribution roughly moves to the area with a lower value than the threshold thr2 after the change of aspect ratio, while the genuine person distribution roughly moves to the area with a higher value than the threshold thr1 after the change of aspect ratio. That is, the change of aspect ratio makes the differentiation between the genuine person and different person clear as shown in FIG. 12.

When the determination section 52 or redetermination section 54 has determined that the person to be authenticated is a registrant, the processing executing section 55 (FIG. 8) generates control data for staring predetermined processing and transmits the generated control data to an internal or external device connected to the interface 14. The internal or external device that receives the control data locks a door for a certain period of time, releases the restriction on a predetermined operation mode, or the like, as the predetermined processing.

On the other hand, when the determination section 52 or redetermination section 54 has determined that the person to be authenticated is not a registrant, the processing executing section 55 notifies a user (person to be authenticated) through the display section 15 or audio output section 16 that he or she is not accepted as a registrant.

(1-3) Authentication Processing Procedure

Figure 13:
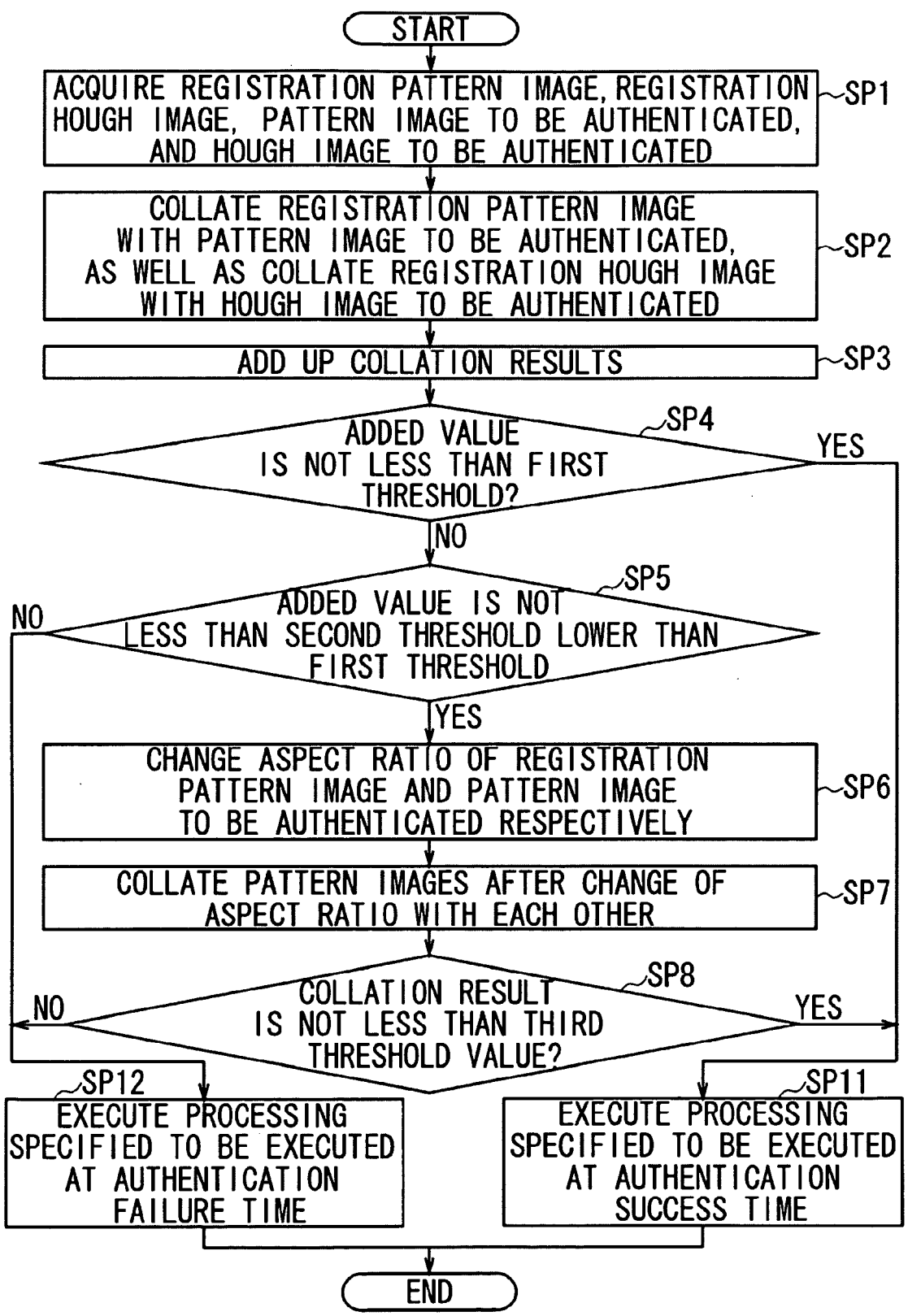
FIG. 13 is a flowchart showing an authentication processing procedure.

An authentication processing procedure executed in the authentication section 42 (FIG. 7) will next be described. As shown in FIG. 13, when determining to execute the authentication mode, the authentication section 42 starts the authentication processing procedure. In step SP1, the authentication section 42 acquires the registration pattern image, registration Hough image, pattern image to be authenticated, and Hough image to be authenticated and then proceeds to step SP2.

In step SP2, the authentication section 42 collates the registration pattern image with the pattern image to be authenticated, and also collates the registration Hough image with the Hough image to be authenticated and then proceeds to step SP3.

In step SP3, the authentication section 42 adds up a value obtained as a result of the collation between the pattern images and a value obtained as a result of collation between the Hough images and proceeds to step SP4, where the authentication section 42 compares the added value with the first threshold.

When the added value is not less than the first threshold, the authentication section 42 determines the person to be authenticated is a registrant (authentication success) and then proceeds to step SP11, where the authentication section 42 executes processing specified to be executed at the time of authentication success.

On the other hand, when the added value is less than the first threshold, the authentication section 42 proceeds to step SP5 and then compares the added value obtained in step SP3 with the second threshold set less than the first threshold. When the added value is less than the second threshold, the authentication section 42 determines that the person to be authenticated is not a registrant (authentication failure) and then proceeds to step SP12, where the authentication section 42 executes processing specified to be executed at the time of authentication failure.

As described above, when the added value of the similarity between vein patterns appearing in the pattern images and similarity between patterns of the Hough images, which are generated from the pattern images and represent a state of a line component having a length not less than a predetermined length, is not less than the first threshold, the authentication section 42 determines that the person to be authenticated is a registrant. On the other hand, the added value is less than the second threshold set less than the first threshold, the authentication section 42 determines that the person to be authenticated is not a registrant.

When the added value is less than the first threshold and not less than the second threshold, the authentication section 42 determines that there is a possibility of an erroneous determination that the person to be authenticated is not a registrant and then proceeds to step SP6. In step SP6, the authentication section 42 changes the aspect ratio of the registration pattern image acquired in step SP1 and the pattern image to be authenticated respectively to thereby emphasis the relationship between the growth direction vein and oblique direction vein (FIG. 11).

In step SP7, the authentication section 42 collates the pattern images (registration pattern image and pattern image to be authenticated) in which the relationship between the growth direction vein and oblique direction vein has been emphasized with each other and then proceeds to step SP8. In step SP8, the authentication section 42 compares a value indicating the similarity between the shapes of the vein patterns obtained as a result of the collation with the third threshold.

When the value indicating the similarity is not less than the third threshold, the authentication section 42 determines that the person to be authenticated is a registrant (authentication success) and then proceeds to step SP11, where the authentication section 42 executes processing specified to be executed at the time of authentication success. On the other hand, when the value indicating the similarity is less than the third threshold, the authentication section 42 determines that the person to be authenticated is not a registrant (authentication failure) and then proceeds to step SP12, where the authentication section 42 executes processing specified to be executed at the time of authentication failure.

As described above, when the added value of the similarity between vein patterns appearing in the pattern images and similarity between patterns of the Hough images, which are generated from the pattern images and represent a state of a line component having a length not less than a predetermined length, is less than the first threshold and not less than the second threshold, the authentication section 42 changes the aspect ratio of the pattern images to thereby emphasis the relationship between the growth direction vein and oblique direction vein.

Then, the authentication section 42 recollates the pattern images after change of aspect ratio with each other. When a value indicating the similarity between the shapes of the vein patterns in which the relationship between the growth direction vein and oblique direction vein has been emphasized which is obtained as a result of the recollation is not less than the third threshold, the authentication section 42 determines that the person to be authenticated is a registrant. When the value is less than the third threshold, the authentication section 42 determines that the person to be authenticated is not a registrant.

(1-4) Operation and Effect

With the above configuration, the authentication apparatus 1 determines whether information (added value of the cross-correlation coefficient, etc. of the pattern images and cross-correlation coefficient, etc. of the Hough images) indicating the similarity between the shape of veins included in a vein image to be authenticated and the shape of veins included in the registration vein image satisfies the condition (less than the first threshold and not less than the second threshold) for determining that there is a possibility of an erroneous determination.

Then, when the above condition is satisfied, the authentication apparatus 1 changes the aspect ratio of the vain image (pattern image) to be authenticated and the registration vein image (pattern image) respectively. As a result, as described in FIG. 11, the difference in the veins included in the vein images (pattern images) is emphasized.

In this state, the authentication apparatus 1 determines whether the person to be authenticated is a registrant based on the similarity (cross-correlation coefficient, etc.) between the shape of veins included in the vein image (pattern image) to be authenticated whose aspect ratio has been changed and shape of veins included in the registration vein image (pattern image) whose aspect ratio has been changed.

As described above, when the shapes of the veins are approximated to each other, the authentication apparatus 1 changes the direction of the plane (x-y) to emphasize the difference in the shapes. This makes the difference in the shapes much clearer than in the case where the height (illuminance) direction of the image is changed so as to emphasize the difference in the shapes, with the result that it is possible to correctly determine whether the person to be authenticated is a registrant even if the shapes themselves of the veins are approximated to each other.

Further, the authentication apparatus 1 adopts, as information indicating the similarity between the shape of veins included in a vein image to be authenticated and shape of the veins included in the registration vein image, the similarity between binary images (pattern images) each composed of a biological part having a constant width and a background component and similarity between images (Hough images) representing a state of a line component having a length not less than a predetermined length which is extracted from the veins in the image (pattern image).

Therefore, the authentication apparatus 1 generates two different patterns from the shape of veins in the vein image and determines whether the similarity concerning the generated patterns satisfies the condition (less than the first threshold and not less than the second threshold) for determining that there is a possibility of an erroneous determination. Thus, even when an image, such as a picked-up image of a radish, approximated to the shape of the veins is input as the image to be authenticated, the authentication apparatus 1 can correctly determine whether a person to be authenticated is a registrant.

With the above configuration, when the shapes of the veins are approximated to each other, the authentication apparatus 1 changes the aspect ratio to emphasize the difference in the shapes for redetermination. This makes it possible to correctly determine whether a person to be authenticated is a registrant even if the shapes themselves of the veins are approximated to each other. As a result, the authentication apparatus 1 capable of improving authentication accuracy can be realized.

(1-5) Modifications of First Embodiment

In the above first embodiment, the vein image is used to perform authentication processing. However, the present invention is not limited to this. For example, various biological images such as a fingerprint image, an iris image, lip print image, face image, or nerve image can be used in authentication processing.

In particular, when an image, such as vein or nerve, having a strong tendency to be formed (extended) in a certain direction is used, it is possible to further emphasize a difference in the shape of biological part included in the image as compared to a case where an image that does not have such a tendency is used and, correspondingly, making it possible to improve authentication accuracy. Incidentally, when a nerve image is used in authentication processing, a nerve-specific marker is injected into the nerves and the maker is picked up by an image pickup section.

In the above first embodiment, whether there is a possibility of an erroneous determination is determined based on whether the added value obtained by adding a value indicating the degree of difference between the pattern image to be authenticated and registration pattern image and a value indicating the degree of difference between the Hough images which are generated from the pattern images and represent a state of a line component having a length not less than a predetermined length is less than the first threshold and not less than the second threshold. However, the present invention is not limited to this but another method may be employed to make the determination.

For example, as the condition for determining that there is a possibility of an erroneous determination, it is possible to adopt a case where the above added value is less than a threshold higher than the first threshold value and not less than a threshold lower than the first threshold.

This condition is very useful to a case where the first threshold, which is a limiting value for identifying a person to be authenticated as a registrant, is not strictly set. Incidentally, the case, as in the first embodiment, where the added value is less than the first threshold and not less than the second threshold set lower than the first threshold is adopted as the condition for determining that there is a possibility of an erroneous determination is useful to a case where the first threshold, which is a limiting value for identifying a person to be authenticated as a registrant, is strictly set. That is, it is only necessary that the condition for determining that there is a possibility of an erroneous determination is set in the range where there is a possibility that genuine person and different person are inverted with the threshold which is a limiting value for identifying a person to be authenticated as a registrant taken as a criterion.

Further, although the condition for determining that there is a possibility of an erroneous determination has two determination factors of a value (degree of difference between two pattern images) directly indicates the similarity in the shape of veins and a value (degree of difference between two Hough images) indirectly indicates the similarity in the shape of veins in the first embodiment, only one of the determination factors can be adopted.

In this case, when the value directly or indirectly indicates the similarity in the shape of the veins falls in the range where there is a possibility that genuine person and different person are inverted with the threshold which is a limiting value for identifying a person to be authenticated as a registrant taken as a criterion, the aspect ratio is changed.

Further, it is possible to adopt, as the determination factor of the condition for determining that there is a possibility of an erroneous determination, one or both of a first detection amount of a biological part (growth direction vein) extending in parallel to a reference direction (growth direction) included in a biological image (vein image, in the case of the first embodiment) and a second detection amount of a biological part (oblique direction vein) inclined by an angle larger than 0° with respect to the reference direction (growth direction) included in the same.

In this case, a difference between the first detection amount (or ratio between the first and second detection amounts) detected from the biological image to be authenticated and first detection amount (or ratio between the first and second detection amounts) detected from the registration biological image is a value indicating the similarity in the shape. When this value falls in the range where there is a possibility that genuine person and different person are inverted with the threshold which is a limiting value for identifying a person to be authenticated as a registrant taken as a criterion, the aspect ratio is changed. With the determination method, it is possible to detect the relationship between the biological part (growth direction vein) extending in the reference direction (growth direction) and biological part (oblique direction vein) inclined by an angle larger than 0° with respect to the reference direction (growth direction) in a more direct manner than in the case of the first embodiment, thereby further improving authentication accuracy.

Further, although the added value of the two determination factors is adopted as the determination factor of the condition for determining that there is a possibility of an erroneous determination in the first embodiment, a predetermined weight may be added to each of the two values followed by addition thereof, or the two values may be multiplied.

The determination methods described above are merely examples, and it goes without saying that the possibility of an erroneous determination can be determined by other determination methods.

Further, although the vertical-to-horizontal ratio (aspect ratio) of a biological image to be authenticated and a registering biological image respectively is changed such that the vertical and horizontal dimensions of each of the images before change of aspect ratio (FIG. 10A-1 and FIG. 10B-1) are reversed in the first embodiment, the aspect ratio may be changed in another manner.

For example, in the case where the determination factor of the condition for determining that there is a possibility of an erroneous determination falls in the range where there is a possibility that genuine person and different person are inverted with the threshold which is a limiting value for identifying a person to be authenticated as a registrant taken as a criterion, the aspect ratio may be made larger as the determination factor is brought close to the threshold (criterion). With this method, as the similarity in the shape of the veins becomes higher, it is possible to emphasize the relationship between the biological part (growth direction vein) extending in the reference direction (growth direction, in the case of the first embodiment) and biological part (oblique direction vein) inclined by an angle larger than 0° with respect to the reference direction (growth direction), thereby preventing a useless change of the image state.

Further, although a biological image (vein image, in the case of the first embodiment) after binarization is used as the image to be subjected to the change of vertical-to-horizontal ratio (aspect ratio) in the first embodiment, a biological image (vein image, in the case of the first embodiment) before binarization may be used as the image to be subjected to the change of vertical-to-horizontal ratio (aspect ratio).

In this case, the registration section 24 (FIG. 2) registers in the storage section 13 a vein image (vein image input to the pattern conversion section 22 from the image pickup control section 21) that has not been converted into a pattern image, in addition to the pattern image and Hough image. The aspect ratio changing section 53 (FIG. 8) reads out the vein image that has not been converted into a pattern image as the registration image from the storage section 13 and acquires the vein image to be authenticated from the pattern conversion section 22, changes the aspect ratio of the acquired vein images respectively, and inputs the resultant images to the pattern conversion section 22. Then, the aspect ratio changing section 53 (FIG. 8) supplies the pattern image to be authenticated and registering pattern image that have been generated by the conversion processing in the pattern conversion section 22 and Hough image to the redetermination section 54. In this manner, the vein image before binarization can be set as the image to be subjected to the change of vertical-to-horizontal ratio (aspect ratio) in the first embodiment.

In the case where the biological image (vein image, in the case of the first embodiment) before binarization is used as the image to be subjected to the change of vertical-to-horizontal ratio (aspect ratio), it is possible to prevent aliasing in the biological part (vein) included in the biological image that has been subjected to the change of vertical-to-horizontal ratio (aspect ratio) from being emphasized relative to the biological part before change of the vertical-to-horizontal ratio (aspect ratio), as compared to the case where the biological image after binarization is used as the image to be subjected to the change of vertical/horizontal ratio (aspect ratio), thereby improving accuracy of determination on whether the condition for determining that there is a possibility of an erroneous determination is satisfied or not.

However, even when the biological image (vein image, in the case of the first embodiment) after binarization has been used like the first embodiment, substantially no adverse affect is exerted on the determination accuracy. Further, only the biological image (vein image, in the case of the first embodiment) before binarization to be authenticated may be used as the image to be subjected to the change of vertical-to-horizontal ratio (aspect ratio), in place of the registration biological image before binarization.

Further, although the pattern conversion section 22 includes the preprocessing section 31, image smoothing section 32, edge enhancing section 33, vein smoothing section 34, binarization section 35 and line thinning section 36 in the first embodiment, the configuration of the pattern conversion section 22 may be modified according to need by omitting or replacing a part of the components 31 to 36, or by adding a new component. The same can be said of the processing content (kernel size, etc) in the components 31 to 36.

Further, although the pattern image and Hough image are registered in the first embodiment, only the pattern image is registered, or a parameter or the like that has been curve-approximated to the veins included in the pattern image may be registered. In the case where the parameter that has been curve-approximated to the veins, a reconstruction section for reconstructing the pattern image from the parameter is provided for the authentication mode, and the pattern image reconstructed by the reconstruction section is used as the registration image. This configuration achieves the same effect as the first embodiment.

Further, although the vein registration mode or authentication mode is executed according to a program stored in the ROM in the first embodiment, the vein registration mode or authentication mode may be executed according to a program installed from a program storage medium such as a compact disc (CD), a digital versatile disc (DVD) or a semiconductor memory, or downloaded from a program providing server on the Internet.

Further, although the authentication apparatus 1 has an image pickup function (image pickup section 12), a registration function (registration section 24), and an authentication function (authentication section 42) in the first embodiment, the authentication apparatus 1 may be divided into a plurality of apparatus, e.g., in units of function according to the usage.

(2) Second Embodiment (2-1) Entire Configuration of Authentication System

Figure 14:
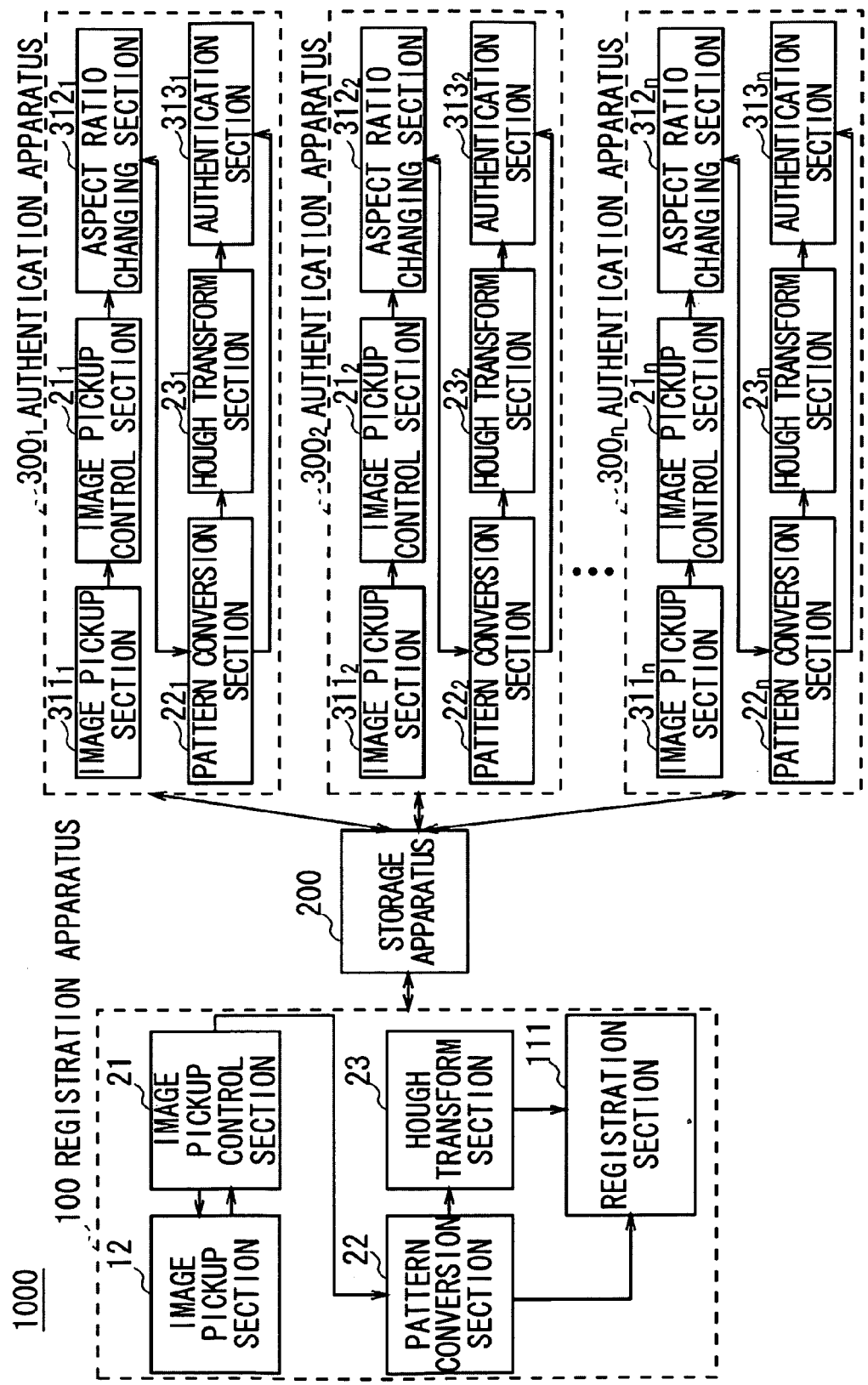
FIG. 14 is a block diagram showing the entire configuration of an authentication system according to a second embodiment of the present invention.

FIG. 14 in which corresponding parts are designated by the same reference numerals as in the first embodiment shows the entire configuration of an authentication system 1000 according to a second embodiment. The authentication system 1000 of FIG. 14 includes a registration apparatus 100, a portable storage apparatus 200 such as a universal serial bus (USB) memory, and a plurality of authentication apparatuses $300_1$ to $300_n$.

The registration apparatus 100 includes an image pickup section 12, an image control section 21, a pattern conversion section 22, a Hough transform section 23 and a registration section 111.

A binary vein image (pattern image) is composed of a vein part having a constant width and a background component is supplied to the registration section 111 through image pickup section 12, image control section 21, and pattern conversion section 22. Further, an image (Hough image) representing a state of a line component having a length not less than a predetermined length is supplied to the registration section 111 through the pattern conversion section 22 and Hough transform section 23.

Figure 15:
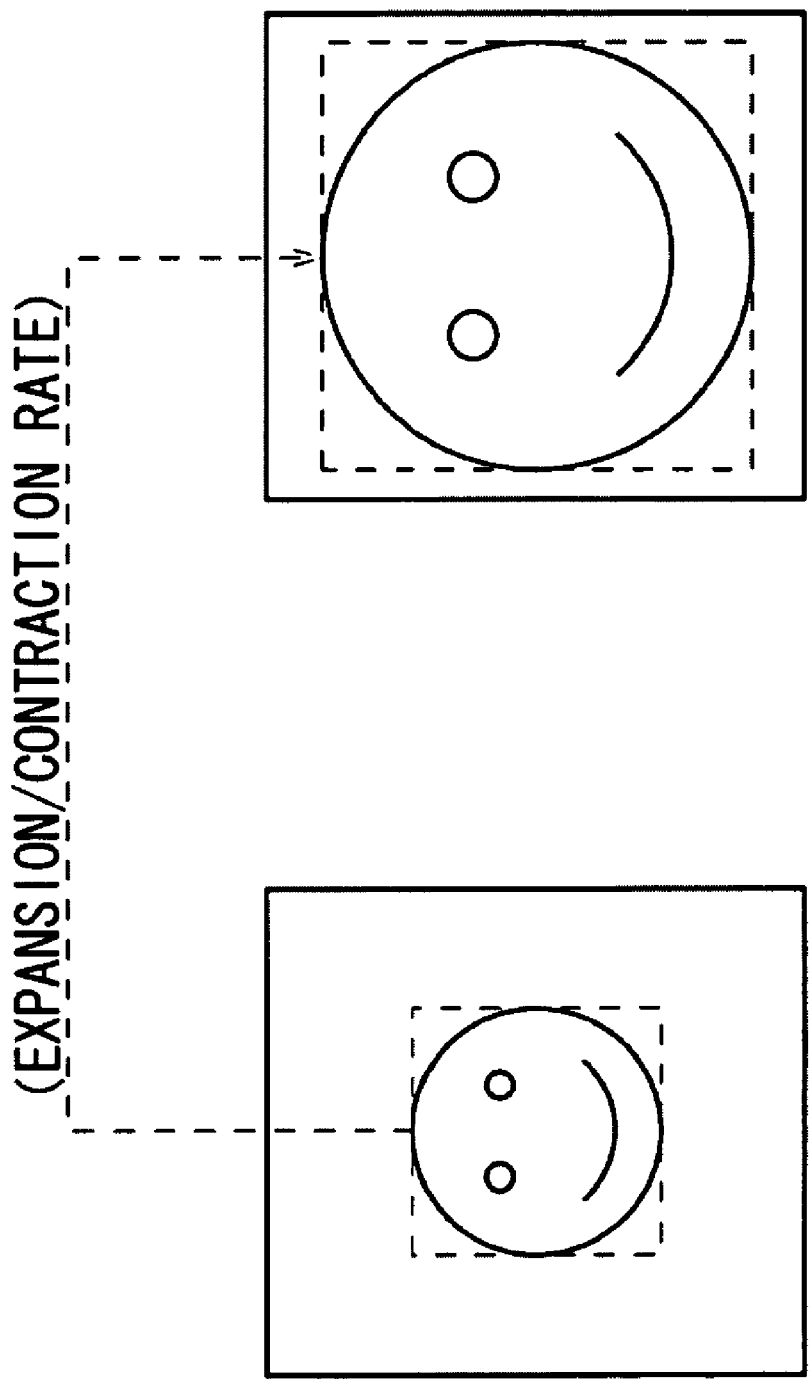
FIG. 15 is a schematic view to help explain the magnification ratio of an object in an image pick section.

Further, as shown in FIG. 15, the registration section 111 has a memory for storing data (hereinafter, referred to also as "magnification ratio information") representing the magnification ratio of an image appearing in an image output as image data from the image pickup section 12 relative to a subject focused on an image pickup element, i.e., expansion/contraction rate of an output subject image relative to an input subject image.

When receiving the pattern image and Hough image, the registration section 111 registers the pattern image and Hough image in the storage apparatus 200 in association with the magnification ratio information stored in the memory.

The authentication apparatus 300 ($300_1$, $300_2$, ..., or $300_n$) has an attachment/detachment section for attachment/detachment to/from the storage apparatus 200 and thereby can read out a registration pattern image and registration Hough image from the storage apparatus 200.

Further, the authentication apparatus 300 ($300_1$, $300_2$, ... or $300_n$) has an image pickup section 311 ($311_1$, $311_2$, ..., or $311_n$), an image pickup control section 21 ($21_1$, $21_2$, ..., or $21_n$), an aspect ratio changing section 312 ($312_1$, $312_2$, ..., or $312_n$), a pattern conversion section 22 ($22_1$, $22_2$, ..., or $22_n$), a Hough transform section 23 ($23_1$, $23_2$, ..., or $23_n$), and an authentication section 313 ($313_1$, $313_2$, ..., or $313_n$).

The image pickup sections ($311_1$ to $311_n$) have substantially the same configuration as that of the image pickup section 12. However, the magnification ratio is different among the image pickup sections ($311_1$ to $311_n$).

The aspect ratio changing section 312 ($312_1$, $312_2$, ..., or $312_n$) has an internal memory that stores the magnification ratio information in the corresponding image pickup section 311 ($311_1$, $311_2$, ..., or $311_n$).

The aspect ratio changing section 312 ($312_1$, $312_2$, ..., or $312_n$) receives a vein image to be authenticated from the corresponding image pickup section 311 ($311_1$, $311_2$, ..., or $311_n$) through the image pickup control section 21 ($21_1$, $21_2$, ..., or $21_n$) and acquires the magnification ratio information concerning the received vein image from the storage apparatus 200 attached to the attachment/detachment section.

Then, the aspect ratio changing section 312 ($312_1$, $312_2$, ..., or $312_n$) determines whether the magnification ratio information stored in the internal memory coincides with the magnification ratio information acquired from the storage section 200 and, if the magnification ratio information differ from each other, changes the aspect ratio of the vein image to be authenticated so that the magnification ratio information coincide with each other. Therefore, a difference in the shape of the veins between the image pickup section 12 for image pickup operation at the registration time and image pickup section 311 ($311_1$, $311_2$, ..., or $311_n$) for image pickup operation at the authentication time which is caused due to the difference in the magnification ratio of a subject is eliminated.

The authentication section 313 acquires a pattern image (binary vein image composed of a vein part having a constant width and a background component) to be authenticated through the corresponding image pickup section 311 ($311_1$, $311_2$, ..., or $311_n$), image pickup control section 21 ($21_1$, $21_2$, ..., or $21_n$), aspect ratio change section 312 ($312_1$, $312_2$, ..., or $312_n$), and pattern conversion section 22 ($22_1$, $22_2$, ..., or $22_n$), and also acquires a Hough image (image representing a state of a line component having a length not less than a predetermined length) to be authenticated through the pattern conversion section 22 ($22_1$, $22_2$, ..., or $22_n$), and Hough transform section 23 ($23_1$, $23_2$, ..., or $23_n$).

The authentication section 313 ($313_1$, $313_2$, ..., or $313_n$) collates a registration pattern image read out from the storage apparatus 200 with the acquired pattern image to be authenticated, and also collates a registration Hough image read out from the storage apparatus 200 with the acquired Hough image to be authenticated.

Then, the authentication section 313 ($313_1$, $313_2$, ..., or $313_n$) adds up a value indicating the similarity in the shape of the veins obtained as a result of the pattern image collation and a value indicating the similarity in the amount of the line component obtained as a result of the Hough image collation and compares the added value with a first threshold.

When the added value is less than the first threshold, which means that one or both of the shape of the veins and the amount of the line component of the veins having a length not less than a predetermined length largely differ from each other even in the case where the magnification ratio of the subject is made equal between the registration time and authentication time, so the determination section 52 determines that a person to be authenticated is not a registrant (authentication failure), and authentication section 313 ($313_1$, $313_2$, ..., or $313_n$) executes processing specified to be executed at the time of authentication failure.

On the other hand, when the added value is not less than the first threshold, which means that one or both of the shape of the veins and the amount of the line component of the veins having a length not less than a predetermined length largely coincide or substantially coincide with each other assuming that the magnification ratio of the subject is made equal between the registration time and authentication time, so the authentication section 313 ($313_1$, $313_2$, ..., or $313_n$) determines that a person to be authenticated is a registrant (authentication success) and executes processing specified to be executed at the time of authentication success.

(2-2) Operation and Effect

With the above configuration, the authentication apparatus 300 ($300_1$, $300_2$, ..., or $300_n$) in the authentication system 100 acquires from the internal memory the magnification ratio (magnification ratio of an output subject image relative to an input subject image) of a subject set in the image pickup section 311 ($311_1$, $311_2$, ..., or $311_n$) that has generated the vein image to be authenticated through image pickup operation, and also acquires the magnification ratio of a subject set in the image pickup section 12 that has generated the registration vein image through image pickup operation from the storage apparatus 200 in which the magnification ratio is registered in association with the registration vein image.

The authentication apparatus 300 ($300_1$, $300_2$, ..., or $300_n$) changes the aspect ratio of the vein image to be authenticated so as to make the magnification ratios equal.

As a result, the magnification ratios with respect to the vein image become identical (same condition), thereby eliminating displacement of the biological part caused due to difference in the magnification ratio.

Then, the authentication apparatus 300 ($300_1$, $300_2$, ..., or $300_n$) determines whether a person to be authenticated is a registrant or not based on the similarity (cross-correlation coefficient, etc.) between the shape of veins included in the vein image (pattern image) to be authenticated whose aspect ratio has been changed and shape of veins included in the registration vein pattern whose aspect ratio has been changed.

Thus, in the case where the shapes of the veins are approximated to each other, whether the approximation of the shapes is based on displacement of a biological part caused due to difference in the magnification ratio or based on actual approximation of the shapes themselves is made clear when the magnification ratio is made equal between the vein image to be authenticated and registration vein image. Therefore, even if the shapes of the veins themselves are approximated to each other, the authentication apparatus 300 ($300_1$, $300_2$, ..., or $300_n$) can correctly determine whether the person to be authenticated is a registrant.

Further, the authentication apparatus 300 ($300_1$, $300_2$, ..., or $300_n$) determines whether the person to be authenticated is a registrant based on the similarity (cross-correlation coefficient, etc.) in the shape of veins included in the pattern images obtained by applying conversion processing to the vein image to be authenticated in which a biological part having a constant width and a background component are represented by binary values and whose aspect ratio has been changed and registration image in which a biological part having a constant width and a background component are represented by binary values whose aspect ratio has been changed. Thus, it is possible to grasp the vein shape pattern more correctly, thereby more correctly determining whether the person to be authenticated is a registrant as compared to a case where the pattern images that have been subjected to the above conversion processing are not used.

With the above configuration, the authentication apparatus 300 ($300_1$, $300_2$, ..., or $300_n$) determines presence/absence of the registrant after the magnification ratio is made equal between the registration vein image and vein image to be authenticated. This makes it possible to correctly determine whether a person to be authenticated is a registrant even if the shapes themselves of the veins are approximated to each other. As a result, the authentication apparatus 300 capable of improving authentication accuracy can be realized.

(2-3) Modifications of Second Embodiment

In the above second embodiment, the vein image is used to perform authentication processing. However, the present invention is not limited to this. For example, various biological images such as a fingerprint image, an iris image, lip print image, face image, or nerve image can be used in authentication processing.

In particular, when an image, such as vein or nerve, having a strong tendency to be formed (extended) in a certain direction is used, it is possible to further emphasize a difference in the shape of biological part included in the image as compared to a case where an image that does not have such a tendency is used and, correspondingly, making it possible to improve authentication accuracy. Incidentally, when a nerve image is used in authentication processing, a nerve-specific marker is injected into the nerves and the maker is picked up by an image pickup section.

Further, although the pattern image and Hough image are registered in the second embodiment, only the pattern image may be registered, or a parameter or the like that has been curve-approximated to the veins included in the pattern image may be registered. In the case where the parameter that has been curve-approximated to the veins, a reconstruction section for reconstructing the pattern image from the parameter is provided for the authentication mode, and the pattern image reconstructed by the reconstruction section is used as the registration image. This configuration achieves the same effect as the second embodiment.

Further, although the aspect ratio of the vein image to be authenticated is changed so as to make the magnification ratio equal between the vein image to be authenticated and registration vein image, the aspect ratio of the registration vein image may be changed so as to make the magnification ratio equal between the vein image to be authenticated and registration vein image.

Further, although the registration image is registered in the storage apparatus 200 by one registration apparatus 100 in the second embodiment, a plurality of registration apparatuses may be provided for the storage apparatus 200. In this case, the magnification ratio in the image pickup sections provided in the respective registration apparatuses may be the same or different among them.

Further, although the registration apparatus 100 having an image pickup function (image pickup section 12) and a registration function (registration section 111) and authentication apparatus $300_1$ to $300_n$ including an image pickup function (image pickup sections $311_1$ to $311_n$) and an authentication function (authentication sections $313_1$ to $313_n$) are used in the second embodiment, the registration apparatus 100 and authentication apparatus $300_1$ to $300_n$ may be each divided into a plurality of apparatus, e.g., in units of function according to the usage. Further, although the registration apparatus 100 has one image pickup function (image pickup section 12) in the second embodiment, it may have a plurality of image pickup functions (image pickup sections 12) having the same magnification ratio or different magnification ratios.

The present invention can suitably be applied to biometrics.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication apparatus comprising:
a first determination section that determines whether a condition for determining that there is a possibility of an erroneous determination is satisfied based on information indicating the similarity between the shape of a biological part included in a biological image to be authenticated and the shape of a biological part included in a registration biological image;
a change section that changes an aspect ratio of the biological image to be authenticated and registration biological image in the case where said condition is satisfied; and
a second determination section that determines whether a person to be authenticated is a registrant based on the similarity between the shape of a biological part included in a biological image to be authenticated whose aspect ratio has been changed and the shape of a biological part included in a registration biological image whose aspect ratio has been changed.

2. The authentication apparatus according to claim 1, wherein
the biological part included in the biological image is the veins included in a vein image.

3. The authentication apparatus according to claim 1, wherein
the biological image is an image in which a biological part having a constant width and a background component are represented by binary values.

4. The authentication apparatus according to claim 1, wherein
the first determination section determines whether the similarity falls in a range defined with a threshold which is a limiting value for identifying a person to be authenticated as a registrant set as a criterion.

5. The authentication apparatus according to claim 1, wherein
the first determination section determines whether a condition for determining that there is a possibility of an erroneous determination is satisfied using first information indicating the similarity between a biological image to be authenticated and a registration biological image and second information indicating the similarity between images which are generated through conversion processing from the biological image to be authenticated and registration biological image and which each represent a state of a line component having a length not less than a predetermined length which is extracted from the biological part in the biological image.

6. The authentication apparatus according to claim 5, wherein
the first determination section determines whether the sum of the first information and second information satisfies the condition for determining that there is a possibility of an erroneous determination.

7. An authentication method comprising:
a first step of determining whether a condition for determining that there is a possibility of an erroneous determination is satisfied based on information indicating the similarity between the shape of a biological part included in a biological image to be authenticated and the shape of a biological part included in a registration biological image;
a second step of changing an aspect ratio of the biological image to be authenticated and registration biological image in the case where said condition is satisfied; and
a third step of determining whether a person to be authenticated is a registrant based on the similarity between the shape of a biological part included in a biological image to be authenticated whose aspect ratio has been changed and the shape of a biological part included in a registration biological image whose aspect ratio has been changed.

8. An authentication apparatus comprising:
an acquisition section that acquires a magnification ratio of a subject set in an image pickup section that has generated a biological image to be authenticated through image pickup operation and magnification ratio of a subject set in an image pickup section that has generated a registration biological image through image pickup operation;
a change section that changes an aspect ratio of the biological image to be authenticated or registration biological image so as to make the magnification ratios acquired by the acquisition section equal to each other;

a determination section that determines whether a person to be authenticated is a registrant based on the similarity between the shape of a biological part included in a biological image to be authenticated whose aspect ratio has been changed and the shape of a biological part included in a registration biological image whose aspect ratio has been changed.

9. An authentication method comprising:

a first step of acquiring the magnification ratio of a subject set in an image pickup section that has generated a biological image to be authenticated through image pickup operation and magnification ratio of a subject set in an image pickup section that has generated a registration biological image through image pickup operation;

a second step of changing the aspect ratio of the biological image to be authenticated or registration biological image so as to make the magnification ratios acquired by the acquisition section equal to each other;

a third step of determining whether a person to be authenticated is a registrant based on the similarity between the shape of a biological part included in a biological image to be authenticated whose aspect ratio has been changed and the shape of a biological part included in a registration biological image whose aspect ratio has been changed.

* * * * *